(12) United States Patent
Tait

(10) Patent No.: US 10,449,877 B1
(45) Date of Patent: Oct. 22, 2019

(54) VEHICLE SEAT WITH SERPENTINE AIR FLOW CHANNEL

(71) Applicant: Faurecia Automotive Seating, LLC, Auburn Hills, MI (US)

(72) Inventor: Shaun Dorian Tait, Troy, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 0 days.

(21) Appl. No.: 15/979,025

(22) Filed: May 14, 2018

(51) Int. Cl.
*B60N 2/56* (2006.01)
*B60H 1/00* (2006.01)

(52) U.S. Cl.
CPC ....... *B60N 2/5642* (2013.01); *B60H 1/00564* (2013.01); *B60N 2/565* (2013.01); *B60N 2/5692* (2013.01)

(58) Field of Classification Search
CPC .... B60N 2/5642; B60N 2/5621; B60N 2/565; B60N 2/5692; B60H 1/00564
See application file for complete search history.

(56) References Cited

U.S. PATENT DOCUMENTS

| | | | |
|---|---|---|---|
| 6,196,627 B1 | 3/2001 | Faust et al. | |
| RE38,128 E | 6/2003 | Gallup et al. | |
| 7,647,780 B2 | 1/2010 | Aoki et al. | |
| 8,176,741 B2 * | 5/2012 | Kameyama | B60H 1/00285 62/239 |
| 8,393,162 B2 | 3/2013 | Chung | |
| 9,857,107 B2 * | 1/2018 | Inaba | B60N 2/5692 |
| 10,065,544 B2 * | 9/2018 | Joshi | B60H 1/00285 |
| 2009/0026813 A1 * | 1/2009 | Lofy | B60N 2/5635 297/180.15 |
| 2011/0061402 A1 | 3/2011 | Jun et al. | |
| 2018/0054858 A1 * | 2/2018 | Dry | B60N 2/5642 |
| 2018/0111527 A1 * | 4/2018 | Tait | B60N 2/5678 |
| 2018/0229632 A1 * | 8/2018 | Line | B60N 2/5642 |

FOREIGN PATENT DOCUMENTS

| | | |
|---|---|---|
| CA | 2599057 A1 | 11/2006 |
| WO | 2015123585 A1 | 8/2015 |

* cited by examiner

*Primary Examiner* — Philip F Gabler
(74) *Attorney, Agent, or Firm* — Reising Ethington P.C.

(57) ABSTRACT

A vehicle seat includes a thermal comfort system including an air duct in a foam cushion, a thermoelectric device, a heat sink extending inside the air duct from the thermoelectric device, and an air mover that causes air to flow from the passenger cabin, through the seating surface, along the air duct and heat sink, and back out of the seat. In a cooling mode, air flowing along air duct absorbs heat from one side of the thermoelectric device via the heat sink while the opposite side of the thermoelectric device absorbs heat from the trim cover via thermal conduction. The air duct can be shaped to position the thermoelectric device near the seating surface for enhanced conductive energy exchange without the need for uncomfortable rigid ductwork.

15 Claims, 2 Drawing Sheets

VEHICLE SEAT WITH SERPENTINE AIR FLOW CHANNEL

TECHNICAL FIELD

The present disclosure relates to a vehicle seat and, in particular, to a vehicle seat with a thermal comfort system.

BACKGROUND

Vehicle seats can be configured to provide a flow of air through the seating surface to enhance environmental comfort of the seat occupant by virtue of the movement of air in the vicinity of the seat occupant's physical contact with the seating surface, which is typically hotter or colder than the seat occupant desires, particularly when the seat occupant is initially seated on especially hot or cold days. Such ventilated vehicle seats may be configured to flow air past a heat exchanger in the seat to heat or cool the air before it is forced out of the seat through the seating surface as conditioned air to provide desired thermal comfort to the seat occupant.

For example, U.S. Pat. No. RE38,128 to Gallup et al. discloses a vehicle seat with a climate control system including individual heat pumps associated with the seat bottom and with the seat back. Dedicated fans blow air through each of the heat pumps, then along air channels inside the seat, and finally out of the seat through the seating surface. The seat back and seat bottom are separately controllable. The heat pumps may include thermoelectric modules that selectively heat or cool the air before it passes through the seating surface. Additional fans are provided to separately blow air along opposite sides of the thermoelectric modules. Heat energy is thus transferred to and from both opposite sides of the thermoelectric modules by forced convection only.

SUMMARY

In accordance with one or more embodiments, a vehicle seat includes a seat bottom and a seat back. At least one of the seat bottom or the seat back includes an air permeable trim cover including a seating surface, an air duct and a thermoelectric device underlying the trim cover, a heat sink attached to the thermoelectric device, and an air mover. The air duct defines an air flow channel in the seat, and the heat sink extends into the air flow channel. The air mover is operable to cause air to flow into the seat through the trim cover, along the air flow channel and heat sink, and out of the seat at a location away from the seating surface. The thermoelectric device is arranged to modulate the temperature of the trim cover by thermal conduction, and the air flow channel is shaped so that air flows in a direction toward the trim cover at an upstream side of the heat sink and in a direction away from the trim cover at a downstream side of the heat sink.

In some embodiments, an angle between the direction toward the trim cover and the direction away from the trim cover is greater than 90 degrees.

In some embodiments, the heat sink is attached to a first side of the thermoelectric device, and an opposite second side of the thermoelectric device is located outside the air flow channel.

In some embodiments, the vehicle seat includes a conductive layer attached to the thermoelectric device. The conductive layer extends along and is in contact with the trim cover.

In some embodiments, the vehicle seat includes a foam cushion underlying the trim cover. At least a portion of the air flow channel extends through the foam cushion.

In some embodiments, the vehicle seat includes at least one air intake channel having a first end in fluidic communication with the trim cover and a second end in fluidic communication with the air flow channel of the air duct at a location upstream from the heat sink. At least some of the air that flows into the seat through the trim cover flows along the air intake channel(s) before flowing along the heat sink and out of the seat.

In some embodiments, the vehicle seat includes at least one air intake channel having a first end in fluidic communication with the trim cover and a second end in fluidic communication with the air flow channel of the air duct at a location downstream from the heat sink. At least some of the air that flows into the seat through the trim cover flows along the air intake channel(s) and out of the seat without flowing along the heat sink.

In some embodiments, the vehicle seat includes a foam cushion underlying the trim cover. A foam portion of the air duct is defined by the foam cushion, and the heat sink extends into the air flow channel along the foam portion of the air duct.

In some embodiments, the heat sink is supported and biased toward the trim cover by the foam cushion.

In some embodiments, the air duct includes an intake portion upstream from the foam portion such that air flows along the intake portion before flowing along the heat sink. The intake portion of the air duct may be formed at least in part by an intake housing formed separately from and attached to the foam cushion.

In some embodiments, the air duct includes an exhaust portion downstream from the foam portion such that air flows along the exhaust portion before exiting the seat. The exhaust portion of the air duct may be formed at least in part by an exhaust housing formed separately from and attached to the foam cushion.

In some embodiments, the vehicle seat includes a duct housing that includes the intake housing and the exhaust housing formed together as a single piece attached to the foam cushion.

In some embodiments, the foam portion of the air duct is formed in the foam cushion and extends between opposite first and second ends located and spaced apart along a surface of the foam cushion facing away from the trim cover. The heat sink extends into the air flow channel at an apex of the foam portion of the air duct positioned between the trim cover and this surface of the foam cushion.

In some embodiments, the vehicle seat includes a foam cushion underlying the trim cover. The foam cushion has a first side facing the trim cover and an opposite second side. The heat sink is located along a U-shaped portion of the air duct that is formed in the foam cushion with opposite first and second ends spaced apart along the second side of the foam cushion.

In some embodiments, the vehicle seat includes a housing and a plurality of air intake channels. The housing is formed separately from the foam cushion and is attached to the second side of the foam cushion. The housing at least partly defines an intake portion of the air duct upstream from the foam portion. The air intake channels are formed in the foam cushion separately from foam portion of the air duct and extend from the first side to the second side of the foam cushion. The intake portion fluidly connects at least one of the air intake channels to the foam portion of the duct such that air flows along a serpentine-shaped path while in the seat. Air flows away from the trim cover in the air intake channel(s) before flowing toward the trim cover to reach the heat sink and then flowing away from the trim cover away again before exiting the seat.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Exemplary embodiments will hereinafter be described in conjunction with the appended drawings, wherein like designations denote like elements, and wherein.

DETAILED DESCRIPTION

The vehicle seat described below uses a thermoelectric device (TED) to help provide thermal comfort to a seat occupant by heating or cooling the seating surface with the TED via thermal conduction. In a cooling mode, air from the passenger cabin of the vehicle can be drawn through the seating surface by an air mover to provide a localized cooling sensation to the seat occupant and to remove heat from the hot side of the thermoelectric device. This air movement through the seating surface can also contribute to modulating the temperature of the seating surface via convective heat transfer. An air duct within the seat can be shaped to position the TED near the seating surface for enhanced conductive energy exchange without the need for uncomfortable rigid ductwork.

Figure 1:
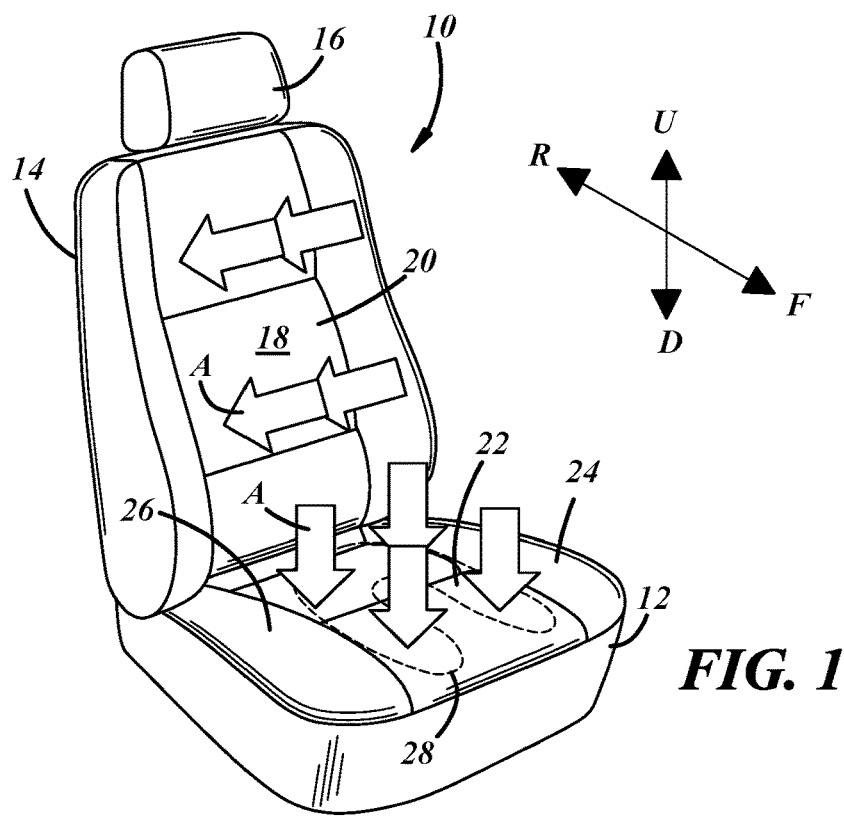
FIG. 1 is a perspective view of an embodiment of a vehicle seat equipped with a thermal comfort system.

FIG. 1 illustrates an exemplary vehicle seat 10 adapted for installation in the passenger cabin of a vehicle via rails along the underside of the seat or other suitable attachment features. The seat 10 includes a seat bottom 12 that supports the majority of the weight of a seat occupant when in use and a seat back 14 extending from the seat bottom. The seat back 14 includes a head rest 16 in this example. Forward (F) and rearward (R) directions are designated in FIG. 1 and may be referred to as longitudinal directions. Upward (U) and downward (D) directions may be referred to as vertical directions, while left and right may be referred to as transverse directions. These directions are with respect to the seat 10 and not necessarily with the vehicle in which the seat is installed. The seat 10 presents a seating surface 18 in the form of an exterior surface of a trim cover 20. Each of the seat bottom 12 and the seat back 14 includes a portion of the seating surface 18, which is in contact with the seat occupant in use. As used herein, the terms "underlying" and "overlying" are in relation to a reference frame in which the seating surface 18 is the topmost surface. For example, an underlying layer in the seat back 14 is generally located rearward of the portion of the seating surface 18 provided by the seat back, and an underlying layer in the seat bottom 12 is generally located beneath the portion of the seating surface provided by the seat bottom.

The seat 10 is a ventilated seat configured to provide air flow (A) through the seating surface 18 when an underlying seat component is pressurized or depressurized, such as via an internal or external fan or blower. The air flow may include air discharged into the passenger cabin through the seating surface in a positive-ventilation or "push" configuration, or it may include ambient air from the vehicle passenger cabin pulled through the seating surface 18 in the illustrated negative-ventilation or "pull" configuration. Positive and negative ventilation may also be combined, with positive ventilation of the seat bottom 12 and negative ventilation of the seat back 14, or vice versa. Or the seat bottom and/or the seat back can each have positive and negative ventilated portions. As noted above, air exiting the seat through the seating surface may be heated or cooled by a heat exchanger prior to exit. The embodiments of the thermal comfort system illustrated in the figures are configured particularly for a pull system, but many of the disclosed advantages may be realized if reconfigured as a push system.

Air flow through the seating surface 18 is enabled in part by at least a portion of the trim cover 20 being air permeable. Perforated leather is one example of an air permeable trim cover 20. Certain woven or knit fabrics are also air permeable. Polymeric materials such as polyvinyl chloride (PVC) or polyurethane can also be used in the trim cover 20 and can be made air permeable via perforations or other suitable means. Different types of materials may also be combined to form the trim cover, so long as it is air permeable at the desired locations. The trim cover 20 may also be a multi-layer material including a plurality of different air permeable materials laminated or otherwise attached together. In the illustrated example, the air flow includes air drawn into the seat 10 along a central portion 22 of both the seat bottom 12 and the seat back 14, which is located between bolster portions 24, 26 located along opposite left and right sides of the seat 10. An exemplary thermal comfort region 28 of the seat bottom 12 is illustrated in broken lines in FIG. 1 representing a region of the seat where air flow may be provided through the trim cover and/or where localized modulation of the temperature of the trim cover via thermal conduction may be provided. In this particular example, the thermal comfort region is generally U-shaped and corresponds to the typical location of the legs and pelvis of the seat occupant. Other configurations are possible. The following description and illustrations are with respect to the seat bottom 12 but are applicable to the seat back 14 as well.

Figure 2:
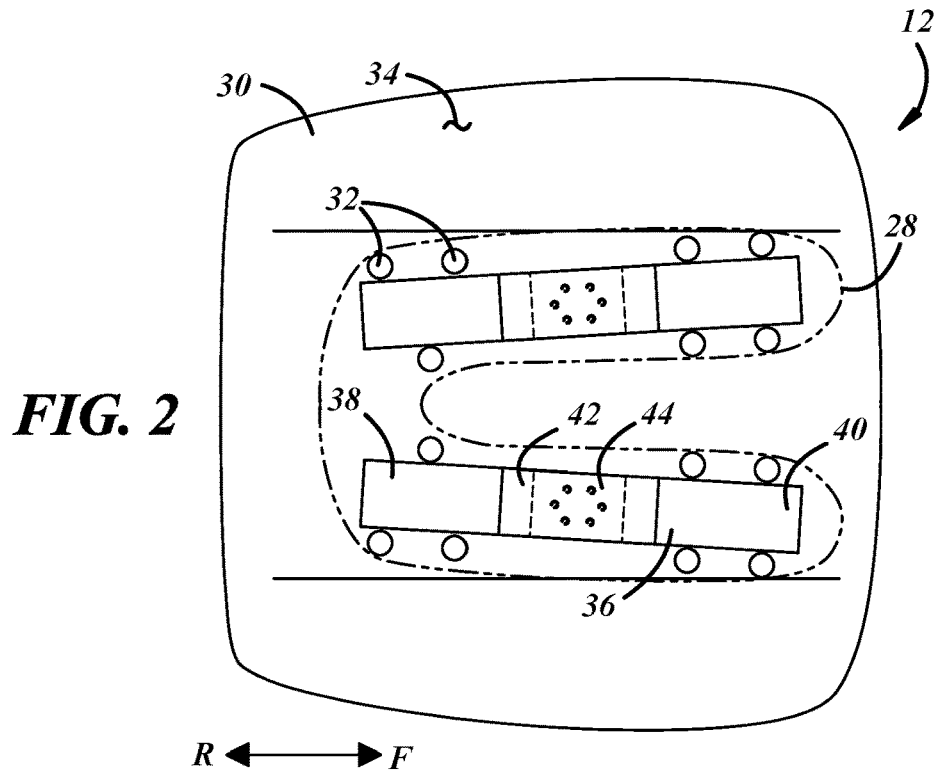
FIG. 2 is a top view of a seat bottom of the vehicle seat with the trim cover omitted to show a conductive layer arranged along a foam cushion with air intake channels.
Figure 3:
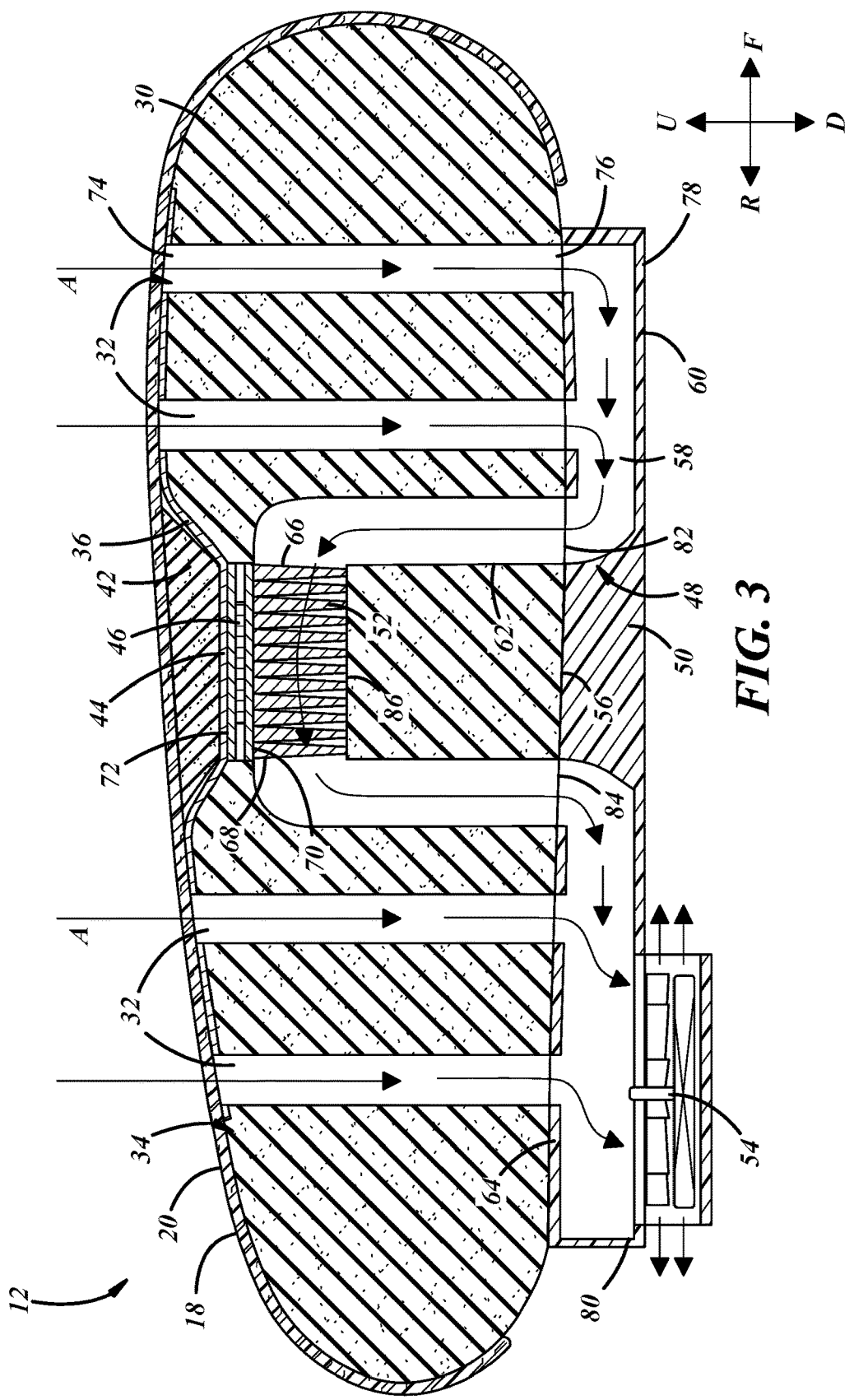
FIG. 3 is a side cross-sectional view of the seat bottom illustrating an example of a serpentine-shaped air flow path along which the air flow changes direction multiple times.

FIG. 2 is a top view of the seat bottom 12 with the trim cover 20 omitted, and FIG. 3 is a cross-sectional side view of the seat bottom taken along the thermal comfort region 28. As illustrated in FIG. 2, the seat bottom 12 includes a foam cushion 30 with a plurality of air intake channels 32 that open along a first or top side 34 of the cushion and extend at least partially therethrough. A thermally conductive layer 36 is disposed over at least a portion of the foam cushion 30. In this example, the conductive layer 36 is in the form of a pair of thermally conductive strips each with opposite lengthwise ends 38, 40 spaced apart in the longitudinal direction. Between the opposite ends 38, 40, each strip extends beneath a cushion insert 42 and has a central portion 44 attached to an underlying thermoelectric device 46 (FIG. 3). The thermal comfort region 28 is defined as a region in which the thermally conductive layer 36 and the air intake channels 32 are located. In this case, the air intake channels 32 open along opposite lengthwise edges of each of the strips of the conductive layer 36. Other arrangements are possible.

FIG. 3 is a side cross-sectional view of the seat bottom 12 illustrating an example of a serpentine-shaped air flow path along which the air flow changes direction multiple times. In addition to the components illustrated in FIG. 2, FIG. 3 illustrates the thermoelectric device 46, an air duct 48, a duct housing 50, a heat sink 52, and an air mover 54. The air mover 54 is a fan, blower, pump, or other suitable device operable to cause air to flow into the seat through the air permeable trim cover 20, along the air duct 48 and heat sink 52, and then back out of the seat. The illustrated duct housing 50 is arranged along a second or bottom side 56 of the foam cushion 30 and, together with the foam cushion, defines the air duct 48. An air flow channel 58 is defined by and within the air duct 48. The illustrated air duct 48 includes an intake portion 60, a foam portion 62, and an exhaust portion 64. The foam portion 62 of the air duct 48 is formed in the foam cushion 30, and the intake and exhaust portions 60, 62 are formed at least in part by the duct housing 50. Air flows through the trim cover 20, into and along the air intake channels 32, along at least a portion of the air duct 48, then back out of the seat. At least some of the air drawn into the seat under operation of the air mover 54 is routed to flow along the heat sink 52 to exchange thermal energy with the thermoelectric device 46, an opposite side of which exchanges thermal energy with the trim cover 20 along a thermally conductive path provided by the conductive layer 36.

Thermal comfort is thereby provided to the seat occupant through combined conductive and convective thermal energy transfer. In a cooling mode, the seat occupant experiences a cooling sensation provided in part by the TED 46 extracting thermal energy through the trim cover 20 via the conductive layer 36 and in part by the air movement in the vicinity of their body and the associated evaporation of perspiration. Some of the same air that moves past the seat occupant's body at the seating surface 18 also flows along the heat sink 52 and absorbs thermal energy from the waste side of the TED, thereby maintaining its capacity to absorb thermal energy from the seating surface. In a heating mode, the polarity of the voltage and the direction of current flow through the TED 46 is reversed so that the seat occupant experiences a heating sensation provided at least in part by the TED transferring thermal energy through the trim cover 20. The air mover 54 may be optionally operated in the heating mode to allow the TED to absorb available thermal energy from the air flow via the heat sink 52 to help maintain the capacity of the TED to provide thermal energy at the opposite side.

Referring again to FIG. 3, the air duct 48 and the thermoelectric device 46 underlie the trim cover 20. The heat sink 52 is attached to the thermoelectric device 46 and extends into the air flow channel 58 defined in the seat by the air duct 48. The air mover 54 is operable to cause air to flow into the seat through the trim cover 20, along the air flow channel 58 and heat sink 52, and out of the seat at a location away from the seating surface 18. The air flow channel 58 is shaped so that air flows in a direction toward the trim cover 20 at an upstream side 66 of the heat sink 52 and in a direction away from the trim cover at a downstream side 68 of the heat sink. In this example, the air flows in an upward direction to reach the heat sink 52 and in a downward direction when flowing away from the heat sink. With the foam portion 62 of the air duct 48 in the illustrated U-shape, the directional change of the air flow from the upstream side 66 to the downstream side 68 is through an angle of 180 degrees. Perfectly parallel portions of the air flow channel 58 are not required, however. The angle between the directions of airflow at the respective upstream and downstream sides 66, 68 of the heat sink 52 may be just over 90 degrees, for example, but may preferably be closer to 180 degrees. When oriented in the direction of the load applied by the seated passenger (e.g., vertically downward in FIG. 3), the air flow channel in the foam portion 62 of the air duct is less likely to collapse or be pinched together. The cushion 30 may be a single continuous piece of molded foam or may be constructed from multiple pieces.

The heat sink 52 is attached to a first side 70 of the thermoelectric device 46, and an opposite second side 72 of the thermoelectric device is located outside the air flow channel 58. This prevents any inadvertent heat exchange between the second side 72 of the TED 46 and the air flowing through any part of the thermal comfort system and helps minimize thermal losses due to convective heat transfer at the second side of the TED. The second side 72 of the thermoelectric device 46 is arranged to modulate the temperature of the trim cover 20 by thermal conduction. This means that there is a continuous path of solid material between the second side 72 of the TED 46 and an inner surface of the trim cover 20. The solid materials along this path preferably have a high thermal conductivity on the order of metallic materials, which is generally greater than 10 W/m-K and preferably greater than 100 W/m-K. Copper, aluminum, or graphite foils or layers are some examples of materials that may be included in the path of solid material between the second side of the TED and the trim cover. In another manner of describing this thermal conduction type of temperature control and thermal energy exchange, there is an absence of air or other fluid flow between the second side of the TED and the trim cover—i.e., there is substantially no forced convection or other convective heat transfer between the second side of the TED and the trim cover.

In the illustrated embodiment, the conductive heat exchange between the TED 46 and the trim cover 20 is facilitated by the thermally conductive layer 36, which has its central portion 44 attached to the second side 72 of the TED and extends to opposite ends along the inner surface of the trim cover 20 between the trim cover and foam cushion 30. The conductive layer 36 may include one or more flexible strips of graphite or multi-layer graphene. In a more particular example, each flexible strip includes graphite pressed and laminated between protective carrier films, such as metal foils or polymer films that are sufficiently thin to minimize thermal losses. Such strips may be about 0.5 mm to 2.0 mm thick, with the majority of the thickness provided by the graphite. The conductive layer 36 serves to selectively locate areas of high thermal energy exchange wherever desired along the seating surface 18—i.e., without the conductive layer, heating and cooling by the TED via thermal conduction is limited to the relatively small area at the second side of the TED.

The thermally conductive layer 36 also allows the TED to be spaced away from the trim cover 20 as illustrated to make it less noticeable or unnoticeable to the seat occupant. In the illustrated embodiment, the cushion insert 42 separates the second side 72 of the TED 46 from the trim cover 20. The cushion insert 42 may be formed from a similar type of foam material as the foam cushion 30 and fills a space between the TED 46 and the trim cover ranging from about 5 mm to about 25 mm. Depending on the particular materials and TED location, a spacing between about 10 mm and about 20 mm, or about 15 mm may be sufficient to make the TED virtually undetectable to the seat occupant with use of the cushion insert 42. It is however contemplated that TEDs could be configured with relatively flexible thermally conductive plates along their opposite sides to place the TED closer to the trim cover.

The illustrated seat bottom 12 includes a plurality of air intake channels 32. Each air intake channel 32 has a first end 74 along the top side 34 of the foam cushion 30 in fluidic communication with the trim cover 20 and a second end 76 in fluidic communication with the air flow channel 58 of the air duct 48. Some of the air flow channels have their second ends 76 connected with the air duct 48 at a location upstream from the heat sink 52, and some of the air flow channels have their second ends connected with the air duct at a location downstream from the heat sink 52. At least some of the air that flows into the seat through the trim cover 20 thus flows along one or more of the air intake channels 32 before flowing along the heat sink 52 and out of the seat. In the example of FIG. 3, at least some of the air that flows into the seat through the trim cover 20 flows along one or more air intake channels 32 and out of the seat without flowing along the heat sink 52. The foam portion 62 of the air duct 48 and the heat sink 52 may in some cases be located so that all of the air drawn into the seat flows along the heat sink before exiting the seat.

With the heat sink 52 extending into the air flow channel 58 along the foam portion 62 of the air duct, the heat sink may be supported by the flexible and elastically deformable material of the foam cushion 30, as illustrated in FIG. 3. Whether located in the seat bottom 12 as shown, or in the seat back, the foam material of the foam cushion 30 can thus serve to support the heat sink 52 and the TED 46 in a flexible manner, allowing this relatively rigid component of the system to move with the compressible foam material and thereby make it less noticeable to the seat occupant even though it is relatively close to the seating surface. The portion of the foam cushion beneath the heat sink 52 in FIG. 3, for example, acts as a sort of spring that biases the TED and heat sink toward the trim cover, allowing it to be displaced within the interior of the seat when the seat is occupied and returning it to its original position when the seat is not occupied.

The duct housing 52 may include an intake housing 78 that defines at least a portion of the intake portion 60 of the duct 48, and/or an exhaust housing 80 that defines at least a portion of the exhaust portion 64 of the duct. These intake and exhaust housings 78, 80 may be formed together as the duct housing 50 in a single piece attached to the foam cushion 30 as illustrated, or they may be formed as separate housings attached to the foam cushion 30 respectively upstream and downstream from the foam portion 62 of the air duct 48. The duct housing 52 may be made from a material having a higher stiffness than the foam material of the cushion 30, such as a rigid or semi-rigid thermoplastic or other suitable material. The duct housing 50 location, away from the seating surface, permits use of a more rigid material, which is sometimes useful to support the weight of the air mover and/or to form parts of the air duct with air flow channels perpendicular to the load direction (e.g., horizontal portions of the air flow channel 58 in FIG. 3) to prevent collapse or pinching of the air flow channel. The duct housing 50 serves to fluidly connect the air intake channels 32, which are separate and distinct from the air duct 48 and air flow channel 58, with the foam portion 62 of the air duct.

The foam portion 62 of the air duct 48 is formed in the foam cushion 30 and extends between opposite first and second ends 82, 84 located and spaced apart along the second side 56 of the cushion, which is facing away from the trim cover 20 in this example. The heat sink 52 extends into the air flow channel 58 at an apex 86 of the foam portion 62 of the air duct, laterally between the two ends of the foam portion of the duct and vertically between the trim cover and the second side 56 of the foam cushion 30. The illustrated foam portion 62 of the duct 48 has an inverted U-shape with vertical portions extending away from the heat sink 52. For purposes of this disclosure, a U-shape does not necessarily include perfectly parallel opposite sides, nor is the U-shape necessarily rounded at the apex 86. Any continuous air flow channel with first and second ends along the same side of the foam cushion with an apex along the flow channel is considered U-shaped.

As illustrated, at least some of the air that flows into the seat through the trim cover 20 may flow along a serpentine-shaped path while in the seat. In particular, air flows through the trim cover 20 and into the air intake channels 32 located upstream from the heat sink 52, then away from the trim cover and through the air intake channels to the intake portion 60 of the duct 38. From the intake portion 60 of the duct 38, the air flows into the foam portion 62 of the duct and turns toward the heat sink 52 and TED 46 in the direction of the trim cover 20. While in the foam portion 62 of the duct, the air flows along the heat sink 52 and changes direction to again flow in a direction away from the trim cover 20. After exiting the foam portion 62 of the duct 38, the air continues along the exhaust portion 64 of the duct, where additional air from different air intake channels may join the air flow, and is discharged from the seat. In this case, the air is discharged beneath the seat bottom 12 through the air mover 54, which is located along a rear bottom portion of the seat bottom. The air mover 54 could alternatively be located anywhere along and/or inside the duct or be one of a plurality of air movers.

The thermoelectric device 46 is a solid-state electrically powered heat pump including particular dissimilar semi-conducting materials arranged between electrodes and/or thermally conductive plates and that produce a temperature differential across the conductive plates when a voltage is applied thereacross. Reversing the polarity of the applied voltage reverses the direction of the temperature differential and, thereby, the heat flux through the TED 46. In this example, one thermally conductive plate (i.e., the bottom plate) of the TED 46 provides the first side 70 of the TED to which the heat sink 52 is affixed, and another thermally conductive plate (i.e., the top plate) provides the second side 72 of the TED to which the conductive layer 36 is attached. As noted above, the illustrated thermally conductive layer 36 may be in the form of two thin and flexible strips comprising a thermally conductive material. Each strip has its central portion 44 attached to the second side 72 of one of the TEDs 46, and each strip extends in opposite frontward and rearward directions from the central portion 44. The illustrated conductive layer 36 is non-limiting and may take on a variety of different shapes and be placed in conductive contact with the TED anywhere along the conductive layer and/or may be in some other non-strip form.

The illustrated configuration places the TED 46 relatively close to the seating surface, away from the relatively rigid duct portions 60, 64 and thereby reduces thermal losses along the thermally conductive layer 36 and reduces the amount of bending required for the conductive layer to reach from the trim cover 20 to the TED. For example, if the TED 46 is located along the second side of the foam cushion 30 with the other portions of the duct 38, the conductive layer 36 would have to extend vertically through the foam cushion 30 to a greater extent, and the required bending angle of the conductive layer would be much greater than illustrated in FIG. 3—i.e., closer to 90 degrees. Such sharp bends can have a negative effect on the thermal conductivity of the conductive layer, especially when the conductor is a relatively brittle material such as graphite. Bending a graphite-containing layer to high angles can cause a thermally "open" condition, analogous to breaking a wire in an electrical connection.

Also, there are thermal losses along the length of the thermally conductive layer 36, analogous to resistive electrical losses along an electrical cable, such that the longer the conductive layer, the less efficient is the thermal energy transfer between the TED and the desired locations of the trim cover. Also, thermally conductive materials can be relatively expensive compared to other materials of the seat bottom, such as foam and other polymeric materials. The ability to place the TED closer to the trim cover reduces the amount of thermally conductive material necessary in the thermally conductive layer, or it allows a thicker and more conductive layer to be made with the same amount of material in a longer thinner layer.

Additionally, placement of the second side 72 of the TED 46 outside the air flow channel 48 avoids inadvertent heating or cooling of the second side of the TED and/or the conductive layer 36, which would also reduce TED performance. The illustrated construction with a path of solid material that limits the heat transfer mode to conduction while avoiding convection optimizes TED performance.

The vehicle seat may include other components and/or layers that are not explicitly illustrated in the figures, such as a reticulated foam or 3D-mesh layer between the foam cushion 30 and trim cover 20, or additional air channels formed along the first side of the foam cushion and/or in non-vertical orientations. Resistance-type heating elements could be included to supplement or to be the primary source of heating in a heating mode, and the disclosed arrangements do not preclude the use of circulatory fluid cooling systems. While described above primarily as part of the seat bottom 12, at least certain features of the disclosed thermal comfort system may also be employed for occupant comfort control along the seat back. For instance, the air flow channel 58 may be defined in the seat back 14 (FIG. 1) such that the air flows toward and away from the trim cover as it flows along the heat sink and exits the seat at along a rear lower portion of the seat back.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle seat comprising a seat bottom and a seat back, at least one of the seat bottom or the seat back comprising:
   an air permeable trim cover including a seating surface;
   an air duct underlying the trim cover and defining an air flow channel in the seat;
   a thermoelectric device underlying the trim cover;
   a heat sink attached to the thermoelectric device and extending into the air flow channel; and
   an air mover operable to cause air to flow into the seat through the trim cover, along the air flow channel and heat sink, and out of the seat at a location away from the seating surface,
   wherein the thermoelectric device is arranged to modulate the temperature of the trim cover by thermal conduction, and
   wherein the air flow channel is shaped so that air flows in a direction toward the trim cover at an upstream side of the heat sink and in a direction away from the trim cover at a downstream side of the heat sink.

2. A vehicle seat as defined in claim 1, wherein an angle between said directions is greater than 90 degrees.

3. A vehicle seat as defined in claim 1, wherein the heat sink is attached to a first side of the thermoelectric device and an opposite second side of the thermoelectric device is located outside the air flow channel.

4. A vehicle seat as defined in claim 1, further comprising a conductive layer attached to the thermoelectric device, the conductive layer extending along and being in contact with the trim cover.

5. A vehicle seat as defined in claim 1, further comprising a foam cushion underlying the trim cover, wherein at least a portion of the air flow channel extends through the foam cushion.

6. A vehicle seat as defined in claim 1, further comprising at least one air intake channel having a first end in fluidic communication with the trim cover and a second end in fluidic communication with the air flow channel of the air duct at a location upstream from the heat sink such that at least some of the air that flows into the seat through the trim cover flows along the at least one air intake channel before flowing along the heat sink and out of the seat.

7. A vehicle seat as defined in claim 1, further comprising at least one air intake channel having a first end in fluidic communication with the trim cover and a second end in fluidic communication with the air flow channel of the air duct at a location downstream from the heat sink such that at least some of the air that flows into the seat through the trim cover flows along the at least one air intake channel and out of the seat without flowing along the heat sink.

8. A vehicle seat as defined in claim 1, further comprising a foam cushion underlying the trim cover, wherein a foam portion of the air duct is defined by the foam cushion and the heat sink extends into the air flow channel along the foam portion of the air duct.

9. A vehicle seat as defined in claim 8, wherein the heat sink is supported and biased toward the trim cover by the foam cushion.

10. A vehicle seat as defined in claim 8, wherein the air duct further comprises an intake portion upstream from the foam portion such that air flows along the intake portion before flowing along the heat sink, the intake portion of the air duct being formed at least in part by an intake housing formed separately from and attached to the foam cushion.

11. A vehicle seat as defined in claim 10, wherein the air duct further comprises an exhaust portion downstream from the foam portion such that air flows along the exhaust portion before exiting the seat, the exhaust portion of the air duct being formed at least in part by an exhaust housing formed separately from and attached to the foam cushion.

12. A vehicle seat as defined in claim 11, further comprising a duct housing that includes the intake housing and the exhaust housing formed together as a single piece attached to the foam cushion.

13. A vehicle seat as defined in claim 11, wherein the heat sink portion of the air duct is formed in the foam cushion and extends between opposite first and second ends located and spaced apart along a surface of the foam cushion facing away from the trim cover, the heat sink extending into the air flow channel at an apex of the foam portion of the air duct positioned between the trim cover and said surface of the foam cushion.

14. A vehicle seat as defined in claim 1, further comprising a foam cushion underlying the trim cover, the foam cushion having a first side facing the trim cover and an opposite second side, wherein the heat sink is located along a U-shaped portion of the air duct that is formed in the foam cushion with opposite first and second ends spaced apart along the second side of the foam cushion.

15. A vehicle seat as defined in claim 14, further comprising:
   a housing formed separately from and attached to the second side of the foam cushion, the housing at least partly defining an intake portion of the air duct upstream from the U-shaped portion; and
   a plurality of air intake channels formed in the foam cushion separately from the U-shaped portion of the air duct and extending from the first side of the foam cushion to the second side of the foam cushion,
   wherein the intake portion fluidly connects at least one of the air intake channels to the U-shaped portion such that air flows along a serpentine-shaped path while in the seat, with air flowing away from the trim cover in the at least one air intake channel before flowing toward the trim cover to reach the heat sink and then flowing away from the trim cover again before exiting the seat.

* * * * *